W. TURNBULL.
ONE-PIECE TRACTOR FRAME AND TRANSMISSION UNIT.
APPLICATION FILED MAY 25, 1918.
1,309,972.
Patented July 15, 1919.
3 SHEETS—SHEET 2.
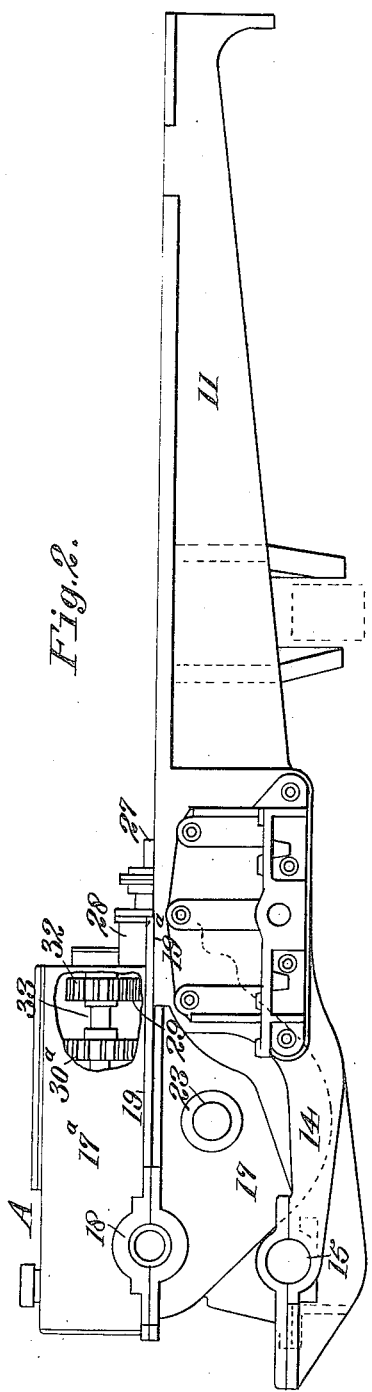
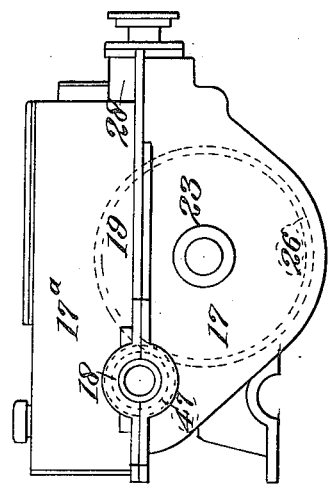
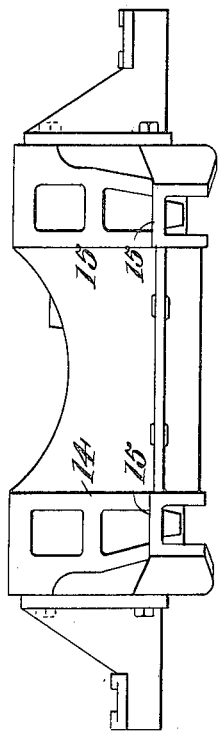
INVENTOR.
William Turnbull
BY
Strong & Townsend
ATTORNEYS

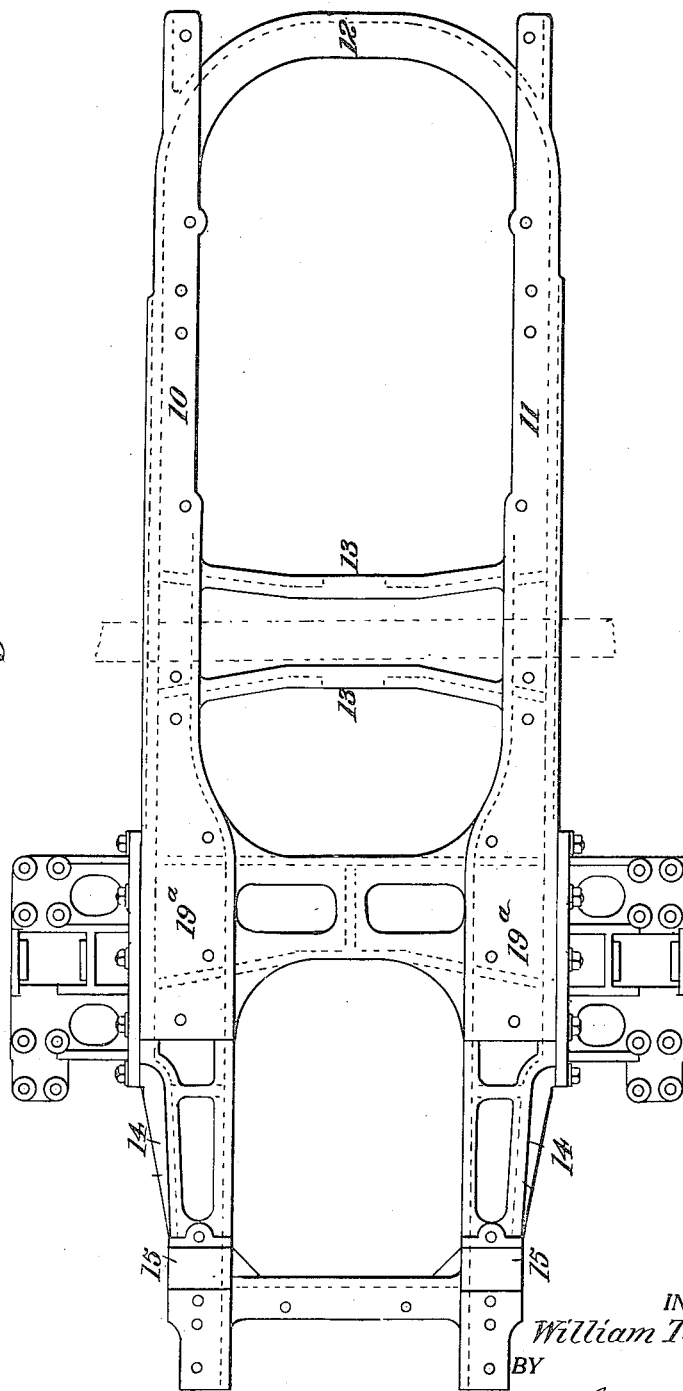

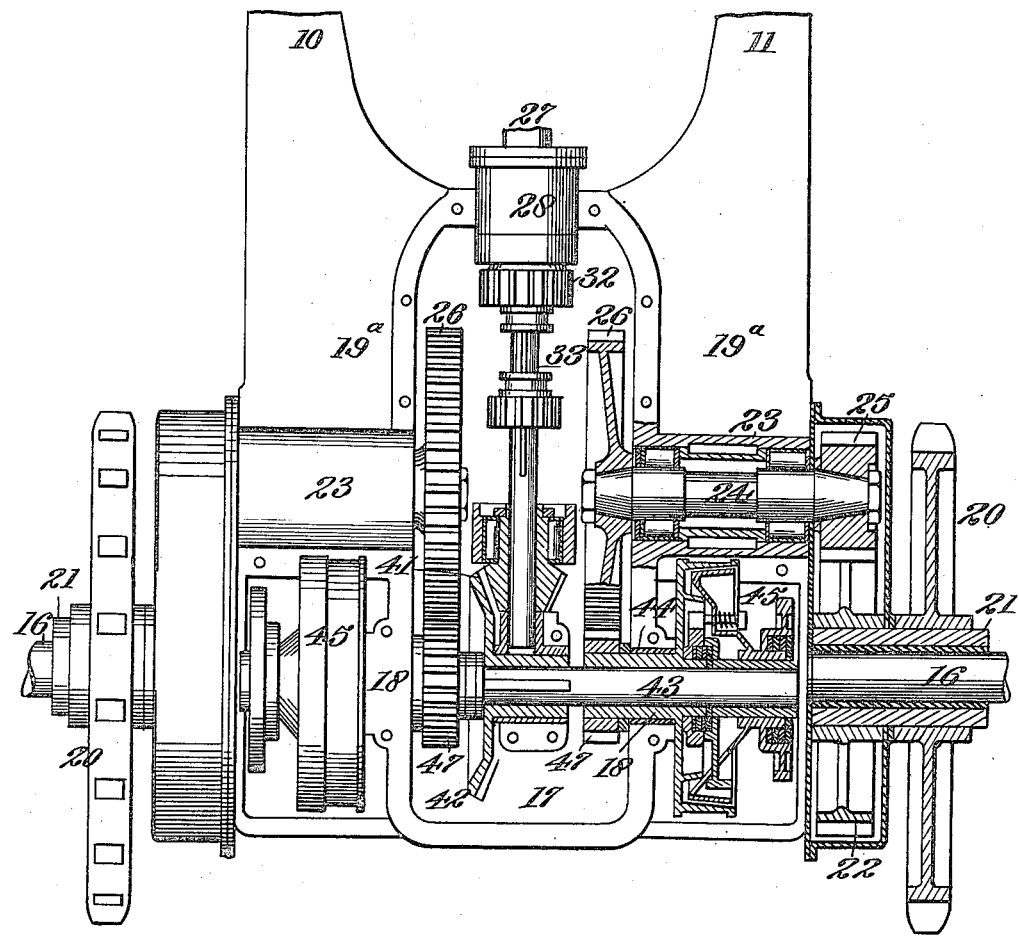

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

ONE-PIECE TRACTOR-FRAME AND TRANSMISSION UNIT.

1,309,972.     Specification of Letters Patent.     Patented July 15, 1919.

Application filed May 25, 1918. Serial No. 236,527.

*To all whom it may concern:*

Be it known that I, WILLIAM TURNBULL, a citizen of the United States, residing at Peoria, in the county of Peoria and State of Illinois, have invented new and useful Improvements in One-Piece Tractor-Frames and Transmission Units, of which the following is a specification.

This invention relates to tractors of the type shown and described in my application Serial No. 77,382, filed February 10th, 1916, and has for its object to simplify and improve the manufacture and assembly of the machine, and particularly to render the transmission mechanism removable and readily accessible.

In the earlier application referred to I have shown and described a one-piece cast metal frame which is adapted to support the entire transmission mechanism. Although the transmission case covered in that instance is removable, it is very difficult to get out the transmission to effect any adjustments or repairs, and often requires dismantling of a considerable part of the traction engine to get down into the bed where the various gears and shafts are located. In the present instance it is the object to so build the frame and transmission that the transmission mechanism, together with the case inclosing the same, is removable as a unit with relation to the frame. The advantages of such a construction are obvious as it affords great convenience in manufacture and assembly and provides a rigid structure eliminating to a great extent the use of bolts and riveting means with the resulting possibility of loose joints.

One form which my invention may assume is exemplified in the following description and illustrated in the accompanying drawings, in which—

Figure 1 is a plan view of the main frame.

Fig. 2 is a side elevation of the main frame showing the transmission and the inclosing case in position.

Fig. 3 is an end view of the main frame.

Fig. 4 is a side elevation of the transmission case.

Fig. 5 is an enlarged plan view, partly in section, showing the transmission mechanism and the inclosing case secured to the main frame.

Referring to the drawings in detail, the main frame comprises parallel side bars 10 and 11, a front end piece 12, forward cross sills 13 and a pair of rearwardly extended offset arms 14 in which are formed the lower half sections of a pair of journals 15 which are provided for the support of a shaft 16. These journals have removable bearing caps 15$^a$ carried by the arms 14. The arms 14 form a continuation of the side bars 10 and 11, but are offset, as shown, forming a rear support for the transmission case generally indicated at A (see Fig. 2).

The transmission case proper consists of a lower section 17 and an upper cover section 17$^a$. Formed by the lower section and on the cover section is a pair of journal boxes 18 for the receptieon of a transmission shaft hereinafter to be described. Formed on the rear end of the casing 17 is a pair of upper journal sections 15$^a$ which registers with the journal sections 15 formed upon the arms 14. The journal sections 15$^a$ are received by the arms 14 and supported thereby. The journals 15 form a support for the rear end of the transmission case, while the forward end is secured by a projecting flange 19 bearing upon the rear ends 19$^a$ of the side bars 10 and 11. A rigid support for the transmission case as a whole is in this manner formed, and it can readily be seen that the transmission case may be removed as a unit with relation to the main frame by merely removing the bolts by which it is secured to the arms 14 and the rear ends of the side bars 10 and 11.

The axle or shaft 16 secured between the mountings 15 and 15$^a$ carries at each end a driving sprocket 20. These sprockets are separately secured to sleeve 21 turnably mounted on the opposite ends of the shaft 16, each sleeve being also provided with a driving gear 22 through which power is transmitted to drive the sprocket wheels 20. Journaled separately in bearing members 23 formed on each side of the lower casing and exterior thereof are shafts 24. These shafts extend through the opposite sides of the lower portion of the casing, there being each fitted with a pinion 25 which meshes with the spur gears 22 fixed upon sleeve 21 of each adjacent sprocket wheel. The inner end of each shaft 24 carries a spur gear 26 receiving power from a change speed transmission mechanism presently to be described, and which transmission mechanism is carried entirely by the cover or detachable upper portion 17ª of the transmission case.

This transmission mechanism includes an engine shaft 27 extending longitudinally of the main frame and journaled in bearings 28, said engine shaft having at its rear end a constantly rotating gear 29. In longitudinal alinement with the engine shaft is journaled a shaft, being a part of the change speed gear transmission. This shaft is suitably supported at one end in a bearing secured to the cover 17ª and at its other end by bearings in the engine shaft. It is otherwise provided with a high speed driving gear 30ª and a low speed driving gear 31 splined thereon and slidable in unison by a shifting mechanism of any suitable form, not here shown. The gear 29 is constantly in mesh with a gear 32 which is secured on a countershaft 33 also carried in journals secured to, or formed integral with, the cover section. Fixed upon the countershaft is a high speed driving gear 36 adapted to be engaged by the gear 30ª and a low speed driving gear 37 adapted to be engaged by the gear 31; also suitable reverse gearing not shown in the drawings.

The above described change speed gear set is in principle substantially like that shown and described in my prior application before referred to, and is to be considered merely as one form of a variety of arrangements which may be employed in carrying out my invention.

The rear end of the main shaft 30 carries a bevel pinion 41 which meshes with a bevel gear secured on a transverse driving shaft 43. This transverse shaft carries right and left-hand sprocket driving sleeves 44, one arranged on each side of the bevel gear 42 and each arranged to be connected to the shaft 43 by means of individual friction clutches, generally indicated at 45, either of the multiple disk or cone type, as here shown, which are operated and controlled as described in my prior application above referred to to permit steering of the vehicle.

The shaft 43 and sleeves 44 are journaled in the divided bearing 18, the upper portion of which is integral with the cover and the lower portion of which is formed integral with the lower case A. Each sleeve 44 has secured thereon a pinion gear 47 to mesh with the adjacent spur gears 26 before referred to.

The operation of the above described transmission mechanism is the same as that shown and described in my prior application referred to to the extent that it is possible to transmit variable speeds either ahead or reverse to either driving sprocket 20, or to both in unison, this being due to the fact that each driving sprocket may be disconnected or connected with a drive shaft 43 through individual clutches 45, and, secondly, to the fact that more than one speed can be transmitted to the drive shaft through the variable speed gear transmission described, it being possible to transmit several speeds ahead and one speed reverse.

It will be noted that, except for the axle 16 supporting the driving sprockets 20, the sleeves 21 and spur gears 22, all parts of the transmission mechanism, including the change speed gear transmission, the drive shaft, the divided shaft and the clutches are removable with the casing. Aside from the advantage of accessibility of the parts of the transmission mechanism, this manner of mounting the casing and the gears carried thereby provides a still greater advantage in that comparatively little machine work is required on the large heavy frame, and it also becomes possible when repair or adjustment is required to remove one transmission case and immediately replace it with a new or spare transmission while the removed transmission is being repaired.

While a specific form of gear transmission is here shown, I wish it understood that any other suitable form may be employed which is capable of performing the functions described.

Similarly the materials and finish of the several parts may be such as the experience and judgment of the manufacturer may dictate.

Having thus described my invention, what I claim and desire to secure by Letters Patent is:

1. In a self-propelled vehicle, a main frame, a lower transmission housing section carried thereby, a removable upper housing section supplemental thereto, and a transmission mechanism carried by the upper housing section and removable therewith.

2. In a self-propelled vehicle, a main frame comprising a pair of side bars and cross bars connecting the same, a pair of offset rearwardly extending arms on the frame, a transmission mechanism, a casing inclosing the transmission mechanism and having journals formed therein to support the same, means for securing the rear end of the casing to the rearwardly projecting arms on the frame and means for securing the forward end of the casing to the rear ends of the side bars of the frame.

3. In a self-propelled vehicle, a main frame comprising a pair of side bars and cross bars connecting the same, a pair of offset rearwardly extending arms on the frame, a transmission mechanism, a casing inclosing the transmission mechanism and having journals formed therein to support the same, means for securing the rear end of the casing to the rearwardly projecting arms on the frame, means for securing the forward end of the casing to the rear ends of the side bars of the frame, a pair of journal members formed in the rearwardly projecting arms on the frame, a pair of complementary upper bearing sections formed on the lower portion of the casing, a shaft secured between said bearing members, a pair of driving sprockets turnably mounted on the shaft, one on each end thereof, and means for transmitting power from the transmission to drive said sprockets.

4. In a self-propelled vehicle, a one-piece cast metal frame comprising a pair of side bars and cross bars connecting the same, a pair of offset rearwardly extending arms on the rear ends of the side bars, a transmission mechanism, a casing inclosing said transmission mechanism, said casing adapted to be secured to the rear ends of the side bars and also to the rearwardly extending arms on the cross bars, a shaft secured between complementary bearing members formed on the transmission case and on the rearwardly extending arms, a driving sprocket turnably mounted on each end of said shaft and means for transmitting power from the transmission to drive each sprocket independently or in unison either ahead or reverse.

5. In a self-propelled vehicle, a one-piece cast metal frame comprising a pair of side bars and cross bars connecting the same, a pair of offset rearwardly extending arms on the rear ends of the side bars, a transmission mechanism, a casing inclosing said transmission mechanism, said casing comprising a bottom section and a cover section, means for securing said sections together, means for securing the rear end of the bottom section of the transmission casing to the rearwardly projecting arms, means for securing the forward end of the cover section to the rear ends of the side bars of the main frame, a variable speed gear transmission journaled in the cover section, a drive shaft extending crosswise of the casing journaled between the cover section and the bottom section, means for transmitting power from the variable speed gear transmission to drive the drive shaft either ahead or reverse, a shaft secured in complementary bearing sections formed on the rearwardly projecting arms and on the bottom section of the transmission casing, a pair of sprocket wheels turnably mounted one on each end of said shaft and means for transmitting power from the drive shaft to drive said sprockets independently of each other or in unison.

6. In a self-propelled vehicle, the combination of a one-piece cast metal frame having formed integral therewith a pair of offset rearwardly extending arms, a transmission mechanism, and a casing inclosing the same adapted to be secured to the frame and the rearwardly extending arms and removable therefrom as a unit.

7. In a self-propelled vehicle, the combination of a one-piece cast metal frame having formed integral therewith a pair of offset rearwardly extending arms, a transmission mechanism, a casing inclosing the same adapted to be secured to the frame and the rearwardly extending arms and removable therefrom as a unit, a shaft secured between the transmission casing and the rearwardly extending arms in complementary bearing members formed in the arms and on the transmission casing, driving members by which the vehicle is propelled loosely turnable one on each end of the shaft and means for transmitting power from the transmission mechanism to drive said driving members.

8. In a self-propelled vehicle, a main frame, a sprocket shaft extending transversely thereof, a lower transmission casing section carried by the frame, and securing the sprocket shaft in position, a complementary upper transmission casing section, and a transmission mechanism dependent therefrom, and adapted to be inclosed by the two casing sections.

In testimony whereof I have hereunto set my hand in the presence of two subscribing witnesses.

WILLIAM TURNBULL.

Witnesses:
EMIL F. NORELINS,
H. B. BAKER.